United States Patent
Miller et al.

(12)

(10) Patent No.: US 6,187,831 B1
(45) Date of Patent: Feb. 13, 2001

(54) PROCESS FOR PRODUCING EXTRUDED FOAM PRODUCTS WITH HIGHER LEVELS OF CO₂ AS A BLOWING AGENT

(75) Inventors: Larry M. Miller, Suffield; Raymond M. Breindel, Hartville; Mitchell Z. Weekley, Akron, all of OH (US)

(73) Assignee: Owens Corning Fiberglas Technology, Inc., Summit, IL (US)

( * ) Notice: Under 35 U.S.C. 154(b), the term of this patent shall be extended for 0 days.

(21) Appl. No.: 09/154,288

(22) Filed: Sep. 16, 1998

(51) Int. Cl.⁷ .......................................................... C08J 9/14
(52) U.S. Cl. ................................ 521/97; 521/79; 521/146
(58) Field of Search ............................... 521/97, 79, 146

(56) References Cited

U.S. PATENT DOCUMENTS

| | | |
|---|---|---|
| 4,176,144 | 11/1979 | Schwab . |
| 4,438,222 | 3/1984 | Nakagawa et al. . |
| 4,459,373 | 7/1984 | Hahn et al. . |
| 4,636,527 | 1/1987 | Suh et al. . |
| 4,764,420 | 8/1988 | Gluck et al. . |
| 5,082,608 | 1/1992 | Karabedian et al. . |
| 5,110,524 | 5/1992 | Harclerode et al. . |
| 5,110,837 | 5/1992 | Harclerode et al. . |
| 5,218,006 | 6/1993 | Reedy et al. . |
| 5,229,429 | 7/1993 | Hahn et al. . |
| 5,240,657 | 8/1993 | Harclerode et al. . |
| 5,244,927 | 9/1993 | Binder et al. . |
| 5,250,577 | 10/1993 | Welsh . |
| 5,258,415 | 11/1993 | Hahn et al. . |
| 5,269,987 | 12/1993 | Reedy et al. . |
| 5,288,740 | 2/1994 | Park et al. . |
| 5,302,624 | 4/1994 | Reedy et al. . |
| 5,332,761 | 7/1994 | Paquet et al. . |
| 5,342,857 | 8/1994 | Reedy et al. . |
| 5,389,694 | 2/1995 | Vo et al. . |
| 5,422,378 | 6/1995 | Vo . |
| 5,426,125 | 6/1995 | Vo et al. . |
| 5,434,195 | 7/1995 | Imeokparia et al. . |
| 5,453,454 | 9/1995 | Alicke et al. . |
| 5,462,794 | 10/1995 | Lindemann et al. . |
| 5,464,881 | 11/1995 | Henn et al. . |
| 5,576,094 | 11/1996 | Callens et al. . |
| 5,595,694 | 1/1997 | Reedy et al. . |

FOREIGN PATENT DOCUMENTS

| | | |
|---|---|---|
| 0 318 846 B1 | 6/1989 | (EP) . |
| 0 360 030 B1 | 3/1990 | (EP) . |
| 0 361 095 A1 | 4/1990 | (EP) . |
| 0 361 096 A1 | 4/1990 | (EP) . |
| 0 464 581 B1 | 1/1992 | (EP) . |
| 0 543 242 B1 | 5/1993 | (EP) . |
| 0 700 413 B1 | 3/1996 | (EP) . |
| 0 802 220 A2 | 10/1997 | (EP) . |
| 63037140 | 2/1988 | (JP) . |
| WO 86/06084 | 10/1986 | (WO) . |
| WO 96/00258 | 1/1996 | (WO) . |
| WO 96/11970 | 4/1996 | (WO) . |
| WO 96/18672 | 6/1996 | (WO) . |
| WO 96/34038 | 10/1996 | (WO) . |

OTHER PUBLICATIONS

Copending U.S. application No. 09/154,067.
Copending U.S. application No. 09/154,367.

*Primary Examiner*—Morton Foelak
(74) *Attorney, Agent, or Firm*—Inger H. Eckert; Anthony R. Chi

(57) ABSTRACT

In one embodiment, the present invention relates to a process for preparing a foam product involving the steps of (A) forming a foamable mixture of (1) a polymer comprising about 10% to about 90% monomers of at least one of meta-substituted styrene and para-substituted styrene and 0% to about 90% monomers of styrene, and (2) a blowing agent containing a major amount of carbon dioxide under a pressure sufficient to prevent prefoaming of the mixture and (B) foaming the mixture into a region of reduced pressure to form the foam product.

13 Claims, No Drawings

PROCESS FOR PRODUCING EXTRUDED FOAM PRODUCTS WITH HIGHER LEVELS OF CO₂ AS A BLOWING AGENT

FIELD OF THE INVENTION

The present invention generally relates to processes for preparing extruded foam products and more particularly to a processes for producing such products having polymer blends with high levels of carbon dioxide as a blowing agent.

BACKGROUND OF THE INVENTION

Extruded synthetic resinous foams are useful materials for many applications including thermal insulation, decorative purposes, packaging and the like. Thermal insulation is one particularly important application for styrene polymer foams. In this application, it is desirable to maintain the insulating value of the foam for as long as possible. It is also desirable for the foam to have dimensional stability. The desirable characteristics can be achieved, in part, by providing foams having uniform cell size.

For a considerable period of time, styrene polymer foams were extruded using various halo-carbons, such as methyl chloride, ethyl chloride, chlorocarbons, fluorocarbons (including HFCs) and chlorofluorocarbons (CFCs) including dichlorodifluoromethane, fluorohydrocarbons or chlorofluorohydrocarbons (which, as the name implies, contain at least one hydrogen atom and have been referred to as "soft CFCs", "HCFCs" and "HFCs"), as blowing agents. Examples of halo-carbons generally include (CFCs) such as CFC-11 which is chlorotrifluoromethane, CFC-12 which is dichlorodifluoromethane, and CFC-113 which is 1,2,2-trifluoro-1,1,2-tri-chloroethane, soft CFCs, HCFCs and HFCs, such as chlorodifluoromethane (F-22), 1,1-dichloro2,2,2-trifluoroethane (F-123), 1-chloro-1,1 -difluoroethane(F-142$b$), 1,1,1,2-tetrafluoroethane (F-134$a$), and 1,1-dichloro-1-fluoroethane (F-141$b$).

Recently, the use of halo-carbons for applications including aerosols, refrigerants, foam-blowing agents and specialty solvents within the electronics and aerospace industries has been terminated by government regulation or is highly undesirable. This is because halo-carbons are believed to destroy the ozone layer in the stratosphere. Attempts have therefore been made to replace halo-carbons with hydrocarbons such as butane or inert gases such as carbon dioxide. However, there are a number of problems associated with using non-halo-carbon blowing agents including low solubility of the blowing agents in styrene polymers, low quality foam production and so on.

The general procedure utilized in the preparation of extruded synthetic resinous foam bodies generally involves the following steps. A resin, such as a polystyrene resin, is heat plastified and one or more fluid blowing agents is incorporated and thoroughly mixed into the plastified resin under conditions which permit thorough mixing of the blowing agent into the plastified resin and prevent foaming of the mixture. The mixture of resin, blowing agent and optional additives is cooled, and the pressure on the mixture is reduced resulting in foaming of the mixture and formation of the desired foam body. In other words, foam bodies are obtained by extruding the cooled plastified mixture of resin, blowing agent and optional additives into a region of lower pressure.

SUMMARY OF THE INVENTION

The present invention relates to polymer foams which are the so-called "extruded foams". The extruded foams have fairly uniform, relatively small average cell size and are thus particularly useful for thermal insulation. The extruded foams also have a relatively low density and thus are even more particularly useful for thermal insulation. Another aspect of the extruded foams is that they possess a high level of dimensional stability. Finally, the extruded foams can be made without blowing agents such as CFCs, HCFCs, HFCs and soft CFCs.

In one embodiment, the present invention relates to a process for preparing a foam product involving the steps of (A) forming a foamable mixture of (1) a polymer comprising about 10% to about 90% monomers of at least one of meta-substituted styrene and para-substituted styrene and 0% to about 90% monomers of styrene, and (2) a blowing agent containing a major amount of carbon dioxide under a pressure sufficient to prevent prefoaming of the mixture and (B) foaming the mixture into a region of reduced pressure to form the foam product.

In another embodiment, the present invention relates to a process of preparing a foam product including the steps of (A) forming a foamable mixture of (1) a copolymer comprising about 1% to about 70% monomers of styrene and about 30% to about 99% monomers of at least one of meta-methylstyrene and para-methylstyrene, and (2) a blowing agent containing a major amount of carbon dioxide under a pressure sufficient to prevent prefoaming of the mixture and (B) foaming the mixture into a region of reduced pressure to form the foam product.

In yet another embodiment, the present invention relates to a foam product containing a copolymer of styrene and at least one of meta-substituted styrene and para-substituted styrene wherein the cells of the foam are free of halogen blowing agents.

DESCRIPTION OF PREFERRED EMBODIMENTS

The foamable mixtures which are extruded and foamed in accordance with the inventive process contain a blowing agent and a polymer. The foamable mixtures may contain other optional additives. The polymer contains monomers of at least one meta-substituted styrene or para-substituted styrene. Alternatively, the polymer is a copolymer of styrene and at least one meta-substituted styrene or para-substituted styrene. The polymer may be further copolymerized with other additional monomers. The polymer or copolymer may be blended with polystyrene or a copolymer containing styrene monomers.

The foamable mixtures which are extruded and foamed in accordance with the process of the present invention contain a polymer which contains monomers of at least one of meta-substituted styrene and para-substituted styrene. The meta-substituted styrene and para-substituted styrene monomers are aromatic compounds of Formula (I) any may be represented by the following formula

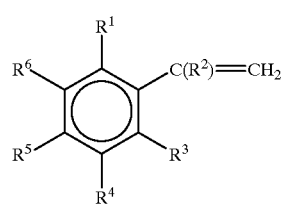

(I)

wherein $R^1$, $R^3$, $R^4$, $R^5$ and $R^6$ are each independently hydrogen, chlorine, bromine, or alkyl groups containing from 1 to about 8 carbon atoms, but at least one of $R^4$, $R^5$ and $R^6$ is an alkyl group containing from 1 to about 8 carbon atoms, and $R^2$ is hydrogen or methyl, with the proviso that a total number of carbon atoms in the monomer does not exceed 20. In a preferred embodiment, at least one of $R^4$, $R^5$ and $R^6$ is an alkyl group containing from 1 to about 4 carbon atoms, such as a methyl group, ethyl group, propyl group, isopropyl group or butyl group. In a more preferred embodiment, only one of $R^4$, $R^5$ and $R^6$ is an alkyl group containing from 1 to about 4 carbon atoms and the other two of $R^4$, $R^5$ and $R^6$ are hydrogen.

In one embodiment, the polymer contains from about 10% to about 100% of at least one of a meta-substituted styrene and a para-substituted styrene monomer. In another embodiment, the polymer contains from about 30% to about 99% of at least one of a meta-substituted styrene and a para-substituted styrene monomer. In yet another embodiment, the copolymer contains from about 50% to about 95% of at least one of a meta-substituted styrene and a para-substituted styrene monomer. In yet another embodiment, the copolymer contains from about 35% to about 45% of at least one of a meta-substituted styrene and a para-substituted styrene monomer. It is believed that using a meta-substituted styrene and/or para-substituted styrene increases the solubility of carbon dioxide in the foamable mixture.

Examples of such meta-substituted styrene and/or para-substituted styrene monomers include 3-methyl styrene, 4-methyl styrene, 2,4-dimethyl styrene, 2,5-dimethyl styrene, 4-chlorostyrene, 3-chlorostyrene, 4-chloromethyl styrene, 3-chloromethyl styrene, 4-bromostyrene, 3-bromostyrene, etc.

In one embodiment, the foamable mixtures which are extruded and foamed in accordance with the process of the present invention contain copolymers which contain about 1% to about 90% of a styrene monomer (% number of monomers of total number of monomers in the polymer). A styrene monomer is an aromatic compound characterized by Formula (II):

$$\text{Ar}-\text{C(R)}=\text{CH}_2 \qquad \text{(II)}$$

wherein Ar represents an aromatic hydrocarbon group of the benzene series and R is hydrogen or a methyl group. In another embodiment, the copolymer contains from about 1% to about 70% of a styrene monomer. In a preferred embodiment, the copolymer contains from about 5% to about 50% of a styrene monomer. In another preferred embodiment, the copolymer contains from about 55% to about 65% of a styrene monomer. Examples of styrene monomers include styrene, alpha-methyl styrene, and alpha,2-dimethyl styrene.

The monomers used in the polymers or the polymers are commercially available in a variety of molecular weights. The molecular weights of such polymers can be determined by several methods well known to those skilled in the art, such as intrinsic viscosity, light scattering, and ultracentrifuge sedimentation. The polymers useful in the foamable mixtures generally have weight average molecular weights from about 30,000 to about 500,000. In another embodiment, the polymers have weight average molecular weights from about 100,000 to about 450,000. In yet another embodiment, the copolymers have weight average molecular weights from about 150,000 to about 400,000.

The flow rate of the melted polymer through an orifice, sometimes described as melt flow index (MFI) or simply melt index, also may be used to compare molecular weight relationships or can be used as a characteristic parameter itself. MFI is a low cost, easily performed technique. Details may be found in a number of publications, such as *Principles of Polymer Chemistry*, by P. J. Flory, Cornell University Press, Ithaca, N.Y., 1953. In one embodiment, the polymers have a melt flow index from about 2 to about 13. In another embodiment, the copolymers have a melt flow index from about 3 to about 10. In yet another embodiment, the polymers have a melt flow index from about 4 to about 8. In a preferred embodiment, the polymers have a melt flow index from about 4 to about 5. MFI can be determined, for example, in accordance with ISO 1133:1 997(E) ($3^{rd}$ Edition).

Useful styrene type resins (also referred to herein as polystyrenes) and meta-substituted styrene or para-substituted styrenes are available commercially and the resins are available with different properties such as melt flow index, molecular weight and so on. For example, various materials are available from ARCO Chemical Company under the general designation "DYLENE", for example DYLENE D-8; from Polysar Ltd., Sarnia, Ontario; from Chevron Chemical Co., for example EB-3100; and from Deltech Corp., Whippany, N.J.

In one embodiment, the properties of the extruded, expanded foamed products obtained by the process of the present invention can be controlled and modified by the selection of the molecular weight of the resins. For example, the preparation of lower density foam bodies is facilitated by using lower molecular weight resins whereas the preparation of higher density foam bodies is facilitated by the use of higher molecular weight or higher viscosity resins.

In another embodiment, the properties of the extruded, expanded foamed products obtained by the process of the present invention can be controlled and modified by the relative amount of styrene monomers and meta-substituted styrene and/or para-substituted styrene monomers used. For example, the preparation of higher density foam bodies according to the invention is facilitated by using a relatively large amount of styrene monomers (within the acceptable ranges) whereas the preparation of lower density foam bodies according to the invention is facilitated by the use of a relatively large amount of meta-substituted styrene and/or para-substituted styrene monomers (within the acceptable ranges).

In yet another embodiment, the properties of the extruded, expanded foamed products obtained by the process of the present invention can be controlled and modified by the relative amount of additional optional monomers used. In this connection, the polymers of at least one of meta- and para-substituted styrene and optionally styrene may further contain one or more additional monomers. In one embodiment, the polymers of at least one of meta- and para-substituted styrene and optionally styrene further contain one or more monomers so long as the polymer has a desirable molecular weight and melt flow index (such as those described above).

In another embodiment, the one or more further additional monomers preferably contain at least one ethylenically unsaturated group which is copolymerizable with the polymer. Examples include one or more monomers of acrylonitrile, phenylene ethers, vinyl chloride, vinylidene chloride, olefins such as ethylene, propylene and copolymers thereof, butadiene, maleic anhydride, citraconic anhydride, itaconic anhydride, vinyl acetate, vinyl toluene, and acrylates such as methacrylate, methyl methacrylate, ethyl acrylate, etc. Mixtures of such resins may be prepared and foamed in accordance with the process of the invention. In one embodiment, the amount of copolymerizable additional monomer in the polymer is from about 0.1% to about 10%, and preferably from about 1% to about 5%.

The blowing agent utilized in the foamable mixtures contains a major amount of carbon dioxide. In one embodiment, the amount of the blowing agent added to the foamable mixture is from about 1% to about 16% by weight based on the weight of the polymer. In another embodiment, the amount of the blowing agent added to the foamable mixture is from about 2% to about 15% by weight based on the weight of the polymer. In yet another embodiment, the amount of the blowing agent added to the foamable mixture is from about 3% to about 10% by weight based on the weight of the polymer. In a preferred embodiment, the amount of the blowing agent added to the foamable mixture is from about 4% to about 8% by weight based on the weight of the polymer. Variations in the amount of blowing agent incorporated into the foamable mixture may be utilized, depending in part on the components of the blowing agent mixtures, to prepare extruded foamed bodies having different desirable characteristics.

A major amount of carbon dioxide means that the blowing agent contains more than 50% by weight carbon dioxide. In one embodiment, the blowing agent contains more than about 60% carbon dioxide, and particularly from about 65% to about 100% of carbon dioxide. In another embodiment, the blowing agent contains from about 70% to about 90% of carbon dioxide. In yet another embodiment, the blowing agent may be about 100% of carbon dioxide.

The blowing agent may be a mixture of carbon dioxide and at least one lower alcohol. A lower alcohol is an alkyl alcohol containing from 1 to about 4 carbon atoms. Lower alcohols include methanol, ethanol, propanol, isopropanol and butanol. The above carbon dioxide and blowing agent mixtures may also be used with additional, optional and supplemental blowing agents, most notably air, nitrogen and water as described below.

Particularly useful mixtures of blowing agents include mixtures comprising:

51–90% of carbon dioxide and 10–49% of ethanol;
60–80% of carbon dioxide and 20–40% of ethanol;
51–90% of carbon dioxide and 10–49% of methanol;
60–80% of carbon dioxide and 20–40% of methanol;
51–90% of carbon dioxide and 10–49% of water; and
60–80% of carbon dioxide and 20–40% of water.

The optional use of a lower alcohol in combination with carbon dioxide provides extruded expanded foam products or bodies having larger cell sizes (from about 1% to about 25% larger in size) when compared to similar density bodies produced with carbon dioxide without a lower alcohol. Additionally, the blowing agent blends including carbon dioxide may contribute to extruded expanded foam products or bodies having improved compressive strengths at comparable densities. Extruded expanded foam products of acceptable characteristics are obtained utilizing the above blowing agent and blowing agent mixtures, and there is no necessity to use halo-carbon blowing agents.

In a preferred embodiment, the blowing agent is free of halogen blowing agents. Halogen blowing agents include halo-carbons such as chlorofluorocarbons, fluorocarbons, soft chlorofluorocarbons, fluorohydrocarbons, and chlorofluorohydrocarbons (typically of methane and ethane). Specific examples of halogen blowing agents include methylchloride, ethylchloride, chlorotrifluoromethane, dichlorodifluoromethane, 1,2,2-trifluoro-1,1, 2-trichloroethane, chlorodifluoromethane, 1,1-dichloro-2,2,2-trifluoroethane, 1-chloro-1,1-difluoroethane, 1,1,1,2-tetrafluoroethane and 1,1-di-chloro-1-fluoroethane among others. Since halogen blowing agents can be harmful to the environment, their use is not desirable.

The blowing agent including blowing agent mixtures utilized in the process may be added to the foamable mixtures in any conventional manner. The blowing agent can be incorporated into the foamable mixture (combined with the polymer) before, during or after polymerization. In one embodiment, the blowing agent may be directly injected into the foamable mixture in a heat plastifying and mixing apparatus such as an extruder. When more than one blowing agent is to be utilized, each of the blowing agents may be separately injected into the heat plastifying and mixing apparatus.

In addition to the polymer and blowing agent, the foamable mixtures may contain, and generally do contain other additives which are included to modify certain characteristics and or properties of the foamable mixtures or the resultant foam bodies. For example, nucleating agents may be included to further reduce the primary cell size. Suitable nucleating agents include talc, calcium silicate, calcium carbonate, calcium stearate, clay, silica, titanium oxide, barium sulfate, diatomaceous earth, indigo, etc. In one embodiment, from about 0.01 to about 2 parts of nucleating agent per 100 parts of the polymer are incorporated into the foamable mixture. In a preferred embodiment, from about 0.05 to about 1 part of nucleating agent per 100 parts of the polymer is incorporated into the foamable mixture.

Plasticizers may also be added to the foamable mixture to facilitate processing of the foamable mixture in an extruder. In a preferred embodiment, the plasticizer is a low molecular weight resin (molecular weight below about 20,000). Examples of plasticizers include liquid paraffin or white oil, hydrogenated coconut oil, esters of $C_4$–$C_{20}$ monoalcohols, diols glycerine with higher fatty acids, styrene resin, vinyl toluene resin, alpha-methylstyrene resin, lower alcohols (containing 1 to about 4 carbon atoms), etc. In one embodiment, from about 0.1 to about 20 parts of plasticizer per 100 parts of the polymer is incorporated into the foamable mixture. In a preferred embodiment, from about 1 to about 15 parts of plasticizer per 100 parts of the polymer are incorporated into the foamable mixture.

Flame-retardant chemicals may also be added to the foamable mixture to impart flame retardant characteristics to the resulting foamed bodies. Flame-retardant chemicals include brominated aliphatic compounds such as hexabromocyclododecane and pentabromocyclohexane, brominated phenyl ethers, esters of tatrabromophthalic acid, and combinations thereof. In one embodiment, from about 0.1 to about 5 parts of flame-retardant chemicals per 100 parts of the polymer is incorporated into the foamable mixture. In a preferred embodiment, from about 0.5 to about 3 parts of flame-retardant chemicals per 100 parts of the polymer are incorporated into the foamable mixture.

Other useful additives include stabilizers, pigments, elastomers, extrusion aids, antioxidants, fillers, antistatic agents, UV absorbers, etc. These other additives can be included at any amount to obtain the desired characteristics in the foamable mixtures or resultant foamed bodies. The optional additives can be incorporated into the foamable mixture (combined with the polymer and blowing agent) before, during or after polymerization.

Generally speaking, the components of the foamable mixture are combined and mixed, followed and/or accompanied by heating to a first temperature under a first pressure to form a plastified foamable mixture. From the extruder, the plastified foamable mixture is cooled to a second temperature (generally referred to as die melt temperature) and extruded into a region of reduced pressure to form a foam product. However, any process for making foams from the foamable mixtures according to the invention may be employed.

The first temperature must be sufficient to plastify or melt the mixture. In one embodiment, the first temperature is from about 135° C. to about 240° C. (below about 240° C.). In another embodiment, the first temperature is from about 145° C. to about 210° C. (below about 210° C.). In a preferred embodiment, the first temperature is from about 150° C. to about 165° C. (below about 165° C.). In one embodiment, the second temperature or die melt temperature is from about 140° C. to about 105° C. (below about 140° C.). In another embodiment, the second temperature or die melt temperature is from about 130° C. to about 110° C. (below about 130° C.). In a preferred embodiment, the second temperature or die melt temperature is from about 125° C. to about 115° C. (below about 125° C.).

The first pressure must be sufficient to prevent the foamable mixture containing the blowing agent from prefoaming. Prefoaming involves the undesirable premature foaming of the foamable mixture before it reaches the region of reduced pressure (foaming of the foamable mixture before foaming is desired). Accordingly, the first pressure varies depending upon the identity and amount of blowing agent in the foamable mixture. In one embodiment, the first pressure is from about 700 pounds per square inch absolute (psia) to about 4500 psia. In another embodiment, the first pressure is from about 840 psia to about 4000 psia. In a preferred embodiment, the first pressure is from about 1150 psia to about 3500 psia. The second pressure is sufficient to induce conversion of the foamable mixture into a foam body. In one embodiment, the second pressure is from about 0 psia to about 28 psia. In another embodiment, the second pressure is from about 1.4 psia to about 21 psia. In a preferred embodiment, the second pressure is from about 2.8 psia to about 15 psia.

The foam bodies (foam products including foam boards, foam sheets, foam insulation and other foam structures) prepared in accordance with the invention are characterized generally as having the following characteristics.

The resultant foam bodies generally have a relatively low density, typically less than about 3 lbs/ft$^3$. Density can be determined, for example, in accordance with ASTM D1622-88. In one embodiment, the foam bodies have a density from about 0.1 to about 3 lbs/ft$^3$. In another embodiment, the foam bodies have a density from about 0.5 to about 2.75 lbs/ft$^3$. In a preferred embodiment, the foam bodies have a density from about 1 to about 2.6 lbs/ft$^3$. In a more preferred embodiment, the foam bodies have a density from about 1.5 to about 2.5 lbs/ft$^3$.

The resultant foam bodies generally have a relatively small average cell size, typically less than about 0.4 mm. Average cell size can be determined, for example, according to ASTM D3576-77. In one embodiment, the foam bodies have an average cell size from about 0.01 to about 0.4 mm. In another embodiment, the foam bodies have an average cell size from about 0.05 to about 0.35 mm. In a preferred embodiment, the foam bodies have an average cell size from about 0.1 to about 0.3 mm. In a more preferred embodiment, the foam bodies have an average cell size from about 0.15 to about 0.25 mm.

The resultant foam bodies generally have a relatively uniform average cell size, typically more than about 50% of the cells have a size within about 0.06 mm of the average cell size. In one embodiment, more than about 60% of the cells have a size within about 0.06 mm of the average cell size. In another embodiment, more than about 50% of the cells have a size within about 0.05 mm of the average cell size. In yet another embodiment, more than about 50% of the cells have a size within about 0.045 mm of the average cell size.

The resultant foam bodies generally contain a major amount of closed cells and a minor amount of open cells. The relative amount of closed cells can be determined, for example, according to ASTM D2856-A. In one embodiment, more than about 70% of the cells of the resultant foam bodies are closed cells. In another embodiment, more than about 80% of the cells of the resultant foam bodies are closed cells. In a preferred embodiment, more than about 90% of the cells of the resultant foam bodies are closed cells. In a more preferred embodiment, more than about 95% of the cells of the resultant foam bodies are closed cells.

In one embodiment, the resultant foam bodies made in accordance with the present invention have dimensional stability in any direction of about 5% or less. In another embodiment, the resultant foam bodies made in accordance with the present invention have dimensional stability in any direction of about 4% or less. In a preferred embodiment, the resultant foam bodies made in accordance with the present invention have dimensional stability in any direction of about 3% or less. In a more preferred embodiment, the resultant foam bodies made in accordance with the present invention have dimensional stability in any direction of about 2% or less.

Dimensional stability testing is according to ASTM D-2126/C578. The dimensions of specimens are approximately 4 inches by 4 inches by 1 inch. The samples are conditioned at least overnight. The dimension of the principal axis (vertical, horizontal and extrusion) of the specimens are taken to the nearest ±0.1%. The samples are exposed to a temperature of 70° C±2° at a relative humidity of 97%±3% for a period of seven days. After cooling at room temperature for two hours, the dimensions of the three principal axis (vertical, horizontal and extrusion) of the specimens are taken to the nearest ±0.1%. The percentage dimensional change in each of the three principal axis, positive or negative (absolute value) is then determined to the nearest 0.1%. The industry standard for dimensional stability of preformed, cellular polystyrene thermal insulation as designated by ASTM C-578-87A is a 2% or less change in any direction.

The following examples illustrate the process of the present invention and the foam bodies obtained thereby. The general procedure and the apparatus utilized in the following examples, unless otherwise indicated, is as follows. A plastified resin mixture of the polymer, nucleating agent and flame-retardant is prepared, and a blowing agent is incorporated into the plastified resin mixture to form a foamable mixture. In a preferred embodiment, a nucleation agent and a fire-retardant material are incorporated into the foamable mixture.

The foamed boards which are recovered in accordance with the process of the present invention are evaluated for density, average cell size, compressive strength, etc., by techniques known in the art. The average cell size is an average of the cell sizes as determined in the X, Y and Z directions. The "X" direction is the direction of extrusion; the "Y" direction is the cross machine direction; and the "Z" direction is the thickness. The compressive strength of the foam bodies of the present invention are determined utiliz-

EXAMPLE 1

A foamable mixture containing a copolymer containing 90% by weight styrene monomers and 10% by weight p-methyl styrene monomers, and a blowing agent containing 2.8 pph (of the copolymer) of carbon dioxide and 2.1 pph ethanol. The blowing agent contains 57.1% by weight carbon dioxide. The foamable mixture is extruded and foamed by initially heating the foamable mixture to 134° C. under a pressure of 208 bar. Upon foaming the die pressure is 75 bar and the temperature is 127° C. Characteristics of the resultant foam body are reported in Table 1.

EXAMPLE 2

A foamable mixture containing a copolymer containing 80% by weight styrene monomers and 20% by weight p-methyl styrene monomers, and a blowing agent containing 2.8 pph (of the copolymer) of carbon dioxide and 2.1 pph ethanol. The blowing agent contains 57.1% by weight carbon dioxide. The foamable mixture is extruded and foamed by initially heating the foamable mixture to 135° C. under a pressure of 215 bar. Upon foaming the die pressure is 75 bar and the temperature is 128° C. Characteristics of the resultant foam body are reported in Table 1.

EXAMPLE 3

A foamable mixture containing a copolymer containing 80% by weight styrene monomers and 20% by weight p-methyl styrene monomers, and a blowing agent containing 2.97 pph (of the copolymer) of carbon dioxide and 2.1 pph ethanol. The blowing agent contains 58.5% by weight carbon dioxide. The foamable mixture is extruded and foamed by initially heating the foamable mixture to 133° C. under a pressure of 207 bar. Upon foaming the die pressure is 76 bar and the temperature is 127° C. Characteristics of the resultant foam body are reported in Table 1.

EXAMPLE 4

A foamable mixture containing a copolymer containing 80% by weight styrene monomers and 20% by weight p-methyl styrene monomers, and a blowing agent containing 3.15 pph (of the copolymer) of carbon dioxide and 2.1 pph ethanol. The blowing agent contains 60% by weight carbon dioxide. The foamable mixture is extruded and foamed by initially heating the foamable mixture to 132° C. under a pressure of 203 bar. Upon foaming the die pressure is 80 bar and the temperature is 126° C. Characteristics of the resultant foam body are reported in Table 1.

EXAMPLE 5

A foamable mixture containing a copolymer containing 60% by weight styrene monomers and 40% by weight p-methyl styrene monomers, and a blowing agent containing 3.15 pph (of the copolymer) of carbon dioxide and 2.1 pph ethanol. The blowing agent contains 60% by weight carbon dioxide. The foamable mixture is extruded and foamed by initially heating the foamable mixture to 132° C. under a pressure of 194 bar. Upon foaming the die pressure is 79 bar and the temperature is 126° C. Characteristics of the resultant foam body are reported in Table 1.

EXAMPLE 6

A foamable mixture containing a copolymer containing 60% by weight styrene monomers and 40% by weight p-methyl styrene monomers, and a blowing agent containing 3.32 pph (of the copolymer) of carbon dioxide and 1.92 pph ethanol. The blowing agent contains 63.3% by weight carbon dioxide. The foamable mixture is extruded and foamed by initially heating the foamable mixture to 133° C. under a pressure of 204 bar. Upon foaming the die pressure is 82 bar and the temperature is 126° C. Characteristics of the resultant foam body are reported in Table 1.

EXAMPLE 7

A foamable mixture containing a copolymer containing 60% by weight styrene monomers and 40% by weight p-methyl styrene monomers, and a blowing agent containing 3.5 pph (of the copolymer) of carbon dioxide and 1.75 pph ethanol. The blowing agent contains about 66.7% by weight carbon dioxide. The foamable mixture is extruded and foamed by initially heating the foamable mixture to 133° C. under a pressure of 199 bar. Upon foaming the die pressure is 81 bar and the temperature is 126° C. Characteristics of the resultant foam body are reported in Table 1.

COMPARATIVE EXAMPLE 1

A foamable mixture containing polystyrene and a blowing agent containing 2.8 pph (of polystyrene) of carbon dioxide and 2.1 pph ethanol. The blowing agent contains 57.1% by weight carbon dioxide. The foamable mixture is extruded and foamed by initially heating the foamable mixture to 134° C. under a pressure of 190 bar. Upon foaming the die pressure is 75 bar and the temperature is 127° C. Characteristics of the resultant foam body are reported in Table 1.

COMPARATIVE EXAMPLE 2

A foamable mixture containing polystyrene and a blowing agent containing 2.8 pph (of polystyrene) of carbon dioxide and 2.1 pph ethanol. The blowing agent contains 57.1% by weight carbon dioxide. The foamable mixture is extruded and foamed by initially heating the foamable mixture to 134° C. under a pressure of 211 bar. Upon foaming the die pressure is 78 bar and the temperature is 126° C. Characteristics of the resultant foam body are reported in Table 1.

COMPARATIVE EXAMPLE 3

A foamable mixture containing polystyrene and a blowing agent containing 2.8 pph (of polystyrene) of carbon dioxide and 2.1 pph ethanol. The blowing agent contains 57.1 % by weight carbon dioxide. The foamable mixture is extruded and foamed by initially heating the foamable mixture to 135° C. under a pressure of 224 bar. Upon foaming the die pressure is 74 bar and the temperature is 129° C. Characteristics of the resultant foam body are reported in Table 1.

TABLE 1

FOAM CHARACTERISTICS

|  | CE1 | CE2 | CE3 | E1 | E2 | E3 | E4 | E5 | E6 | E7 |
|---|---|---|---|---|---|---|---|---|---|---|
| DENSITY (#/CuFt) | 2.38 | 2.52 | 2.62 | 2.41 | 2.46 | 2.4 | 2.29 | 2.36 | 2.36 | 2.39 |
| CELL SIZE (mm) | | | | | | | | | | |
| X | 0.21 | 0.22 | 0.2 | 0.23 | 0.22 | 0.21 | 0.19 | 0.19 | 0.2 | 0.18 |
| Y | 0.29 | 0.32 | 0.26 | 0.32 | 0.31 | 0.29 | 0.25 | 0.27 | 0.29 | 0.25 |
| Z | 0.29 | 0.28 | 0.26 | 0.26 | 0.28 | 0.28 | 0.25 | 0.26 | 0.27 | 0.26 |
| AVERAGE | 0.26 | 0.27 | 0.24 | 0.27 | 0.27 | 0.26 | 0.23 | 0.24 | 0.25 | 0.23 |
| STANDARD DEVIATION | 0.046 | 0.05 | 0.035 | 0.046 | 0.046 | 0.043 | 0.035 | 0.044 | 0.048 | 0.044 |
| FRESH COMPRESSIVE STRENGTH (psi) | | | | | | | | | | |
| X | 10.58 | — | 16.34 | 12.71 | 14.6 | 12.61 | 7.85 | 9.9 | 12.37 | 10.1 |
| Y | 17.58 | — | 19.55 | 19.34 | 20.51 | 17.44 | 14.69 | 16.89 | 18.31 | 17.3 |
| Z | 33.33 | — | 39.31 | 25.56 | 33.4 | 35.31 | 35.31 | 37.09 | 41.89 | 40.37 |
| TOTAL | 61.46 | — | 75.2 | 57.61 | 68.51 | 65.31 | 57.85 | 63.88 | 72.57 | 67.77 |
| AVERAGE | 20.5 | — | 25.06 | 19.2 | 22.83 | 21.79 | 19.28 | 21.29 | 24.89 | 22.59 |
| STANDARD DEVIATION | 11.65 | — | 12.44 | 6.43 | 9.62 | 11.95 | 14.3 | 14.12 | 15.62 | 15.82 |

As is apparent from the above description and examples, the process of the present invention for preparing foamed polystyrene bodies such as boards and billets utilizing a blowing agent comprising carbon dioxide and, optionally, lower alcohols, air, water or mixtures thereof, results in foamed bodies having acceptable and, in some instances, improved characteristics when the foamable mixture is extruded into a region of lower pressure.

One advantage associated with the foamable mixtures of the present invention is that the components (and the amount of each component) leads to the ability to maximize the amount of carbon dioxide in the foamable mixture. While not wishing to be to bound by any theory, it is believed that the amount of carbon dioxide in the foamable mixture is maximized due to use of at least one of meta-substituted styrene and para-substituted styrene in the polymer.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A process for preparing a foam product comprising the steps of
   (A) forming a foamable mixture comprising a copolymer and a blowing agent; said blowing agent consisting of about 10% to about 90% monomers of para-substituted styrene and 0% to about 90% monomers of styrene; and said blowing agent consisting of a major amount of carbon dioxide and a lower alcohol under a pressure sufficient to prevent prefoaming of the mixture and
   (B) foaming the mixture into a region of reduced pressure to form the foam product.
2. The process of claim 1 wherein the para-substituent is a linear or branched alkyl group.
3. The process of claim 1 wherein the at least one of meta- or para- substituent is a alkyl group containing from 1 to about 8 carbon atoms.
4. The process of claim 1 wherein the para-substituted styrene is para-methylstyrene.
5. The method of claim 1 wherein the blowing agent is present in an amount from about 2% up to about 15% by weight of the copolymer.
6. The process of claim 1 wherein the lower alcohol is ethanol.
7. The process of claim 1 wherein the copolymer has a melt index from about 2 to about 13.
8. The process of claim 1 wherein the foamable mixture further comprises a low molecular weight resin derived from styrene, vinyl toluene, alpha methylstyrene, or mixtures thereof.
9. A process of preparing a foam product comprising the steps of
   (A) forming a foamable mixture comprising a copolymer and a blowing agent; said copolymer consisting of about 1% to about 70% monomers of styrene and about 30% to about 99% monomers of para-methylstyrene; and said blowing agent consisting of a major amount of carbon dioxide and a lower alcohol under a pressure sufficient to prevent prefoaming of the mixture and
   (B) foaming the mixture into a region of reduced pressure to form the foam product.
10. The process of claim 9 wherein the blowing agent further comprises a lower alcohol.
11. A foam board or sheet comprising a copolymer consisting of styrene and para-substituted styrene wherein the cells of the foam are free of halogen blowing agents.
12. The foam of claim 11 wherein the density of the foam is less than 3 pounds per cubic foot.
13. The foam of claim 11 wherein the average cell size is less than 0.4 millimeter.

* * * * *